United States Patent [19]

Meyn

[11] 4,322,872
[45] Apr. 6, 1982

[54] APPARATUS FOR BREAKING THE NECK OF A FOWL

[76] Inventor: Pieter Meyn, P.O. Box 16, 1510 AA Oostzaan, Netherlands

[21] Appl. No.: 167,197

[22] Filed: Jul. 9, 1980

[30] Foreign Application Priority Data

Jul. 19, 1979 [NL] Netherlands ............... 7905612

[51] Int. Cl.$^3$ ............................................. A22C 21/00
[52] U.S. Cl. ........................................................ 17/12
[58] Field of Search ........................ 17/11, 12, 45, 52

[56] References Cited

U.S. PATENT DOCUMENTS

| | | |
|---|---|---|
| 3,510,807 | 3/1968 | Rejsa et al. |
| 3,750,231 | 8/1973 | Schreuder |
| 4,035,867 | 7/1977 | Meyn ........................ 17/11 |
| 4,184,230 | 1/1980 | Fox et al. ................... 17/12 X |
| 4,249,285 | 2/1981 | Sheehan et al. ............. 17/12X |

FOREIGN PATENT DOCUMENTS 7316480 1/1969 Netherlands .
7502569 4/1969 Netherlands .

*Primary Examiner*—Willie G. Abercrombie
*Attorney, Agent, or Firm*—Bailey, Dority & Flint

[57] ABSTRACT

An apparatus for breaking the neck and making a transverse incision in the skin of the neck of a fowl, which is hanging by the legs from a shackle of an overhead conveyor. The apparatus has a plurality of working units diposed for rotation about a vertical central shaft in synchronization with the overhead conveyor. Each working unit has a slide block slidably mounted on a pair of vertical slide bars. The slide block supports an axially movable rod extending radially outwards from the slide block and is provided with a transversely extending blade for catching the neck of a passing fowl and pulling the neck against the slide block, thereby breaking the neck and making the incision in the skin thereof.

6 Claims, 3 Drawing Figures

APPARATUS FOR BREAKING THE NECK OF A FOWL

BACKGROUND OF THE INVENTION

The invention relates to an apparatus for breaking the neck of a defeathered headless bird hanging by its legs from a shackle of an overhead conveyor, and more in particular to an apparatus of this kind provided with at least one pair of vertically disposed slide bars, which move along in synchronisation with the overhead conveyor during part of its path and slidably support a slide block, which carries an outwardly extending forked clamping member and a pressure bar, which is movable relative to said clamping member in such manner that it allows the neck of a bird to be caught in the opening of the clamping member in a lowered position of the slide block, but when the slide block reaches it upper position the pressure bar closes the opening of the clamping member, thereby breaking the neck, after which the neck is pushed at least partially out of the skin by the pressure bar as the slide block moves downwards again.

An apparatus of this type is described in U.S. Pat. No. 4,035,867. With this known apparatus the pressure bar is an arm, which is pivotably connected with the clamping member and the movements of the arm are controlled by an outlying fixed curve body.

This apparatus has the disadvantage, that the pivoting movement of the pressure bar makes it necessary that the clamping member is relatively wide, which makes it possible that the wings are caught in the clamping member together with the neck and are damaged when the neck is broken. Also the outlying curve body may damage the wings.

Another disadvantage is that the neck tends to slip away to one side or rotate when the clamping member is closed by the pressure arm, similar to the action of a pair of scissors, so that the neck will not always be broken in the right direction, namely in a straight line from the back towards the front of the neck.

SUMMARY OF THE INVENTION

It is therefor the principal object of the invention to overcome the disadvantages described hereinabove.

According to the invention this object is realized with an apparatus of the specified type, by mounting one of the two legs of the forked clamping member axially slidable in the slide block and by having a pressure bar in the shape of a blade laterally extending from the outer end of said slidable leg, which breaks the neck in the clamping member when the slidable leg is pulled back towards the slide block.

This has the advantage that, since the blade moves in a straight line, the opening between the legs of the clamping member may be relatively narrow, so that it is avoided that the wings are unintentionally caught in the clamping member and get damaged when the neck is broken.

Preferably the slidable leg is rotatable over 90° so that the blade may be turned out of the way when the slidable leg is in its extended position and be turned back into position when the slidable leg is pulled back towards the slide block.

This makes a substantial reduction of the distance over which the slidable leg must be extended to give acces to the openning of the forked clamping member possible.

Another object of the invention is to make a short transverse incision in the skin of the neck as the neck is broken. In some countries such an incision is obligatory. The incision must be made with accuracy in the back of the neck in order to avoid severing of the gullet or the windpipe. This object is realized by giving the blade a sharp cutting edge. Thanks to the straight movement of the slidable leg it is ensured that the incision is made exactly in the right position.

BRIEF DESCRIPTION OF THE DRAWINGS

Further objects, features and advantages of the invention will become apparent from the following description of an embodiment of the invention, taken in connection with the accompanying drawings, in which.

DETAILED DESCRIPTION OF A PREFERED EMBODIMENT

Figure 1:
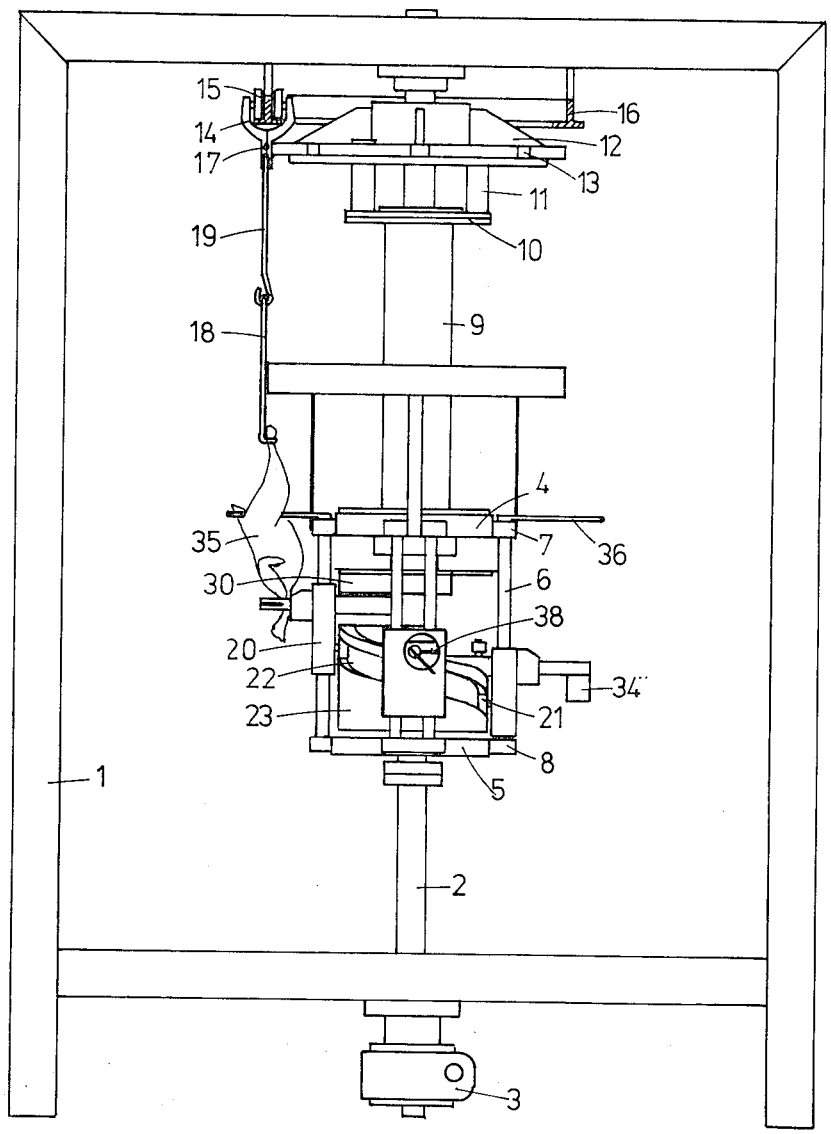
FIG. 1 is a side view of an apparatus according to the invention.
Figure 2:
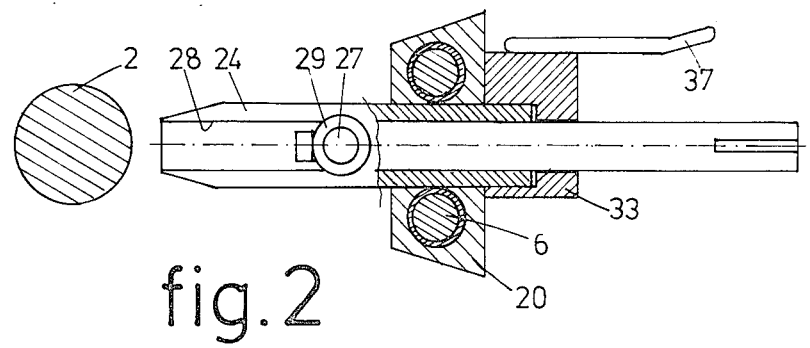
FIG. 2 is an enlarged top view of a breaking unit of the apparatus according to the invention, partially in cross section.
Figure 3:
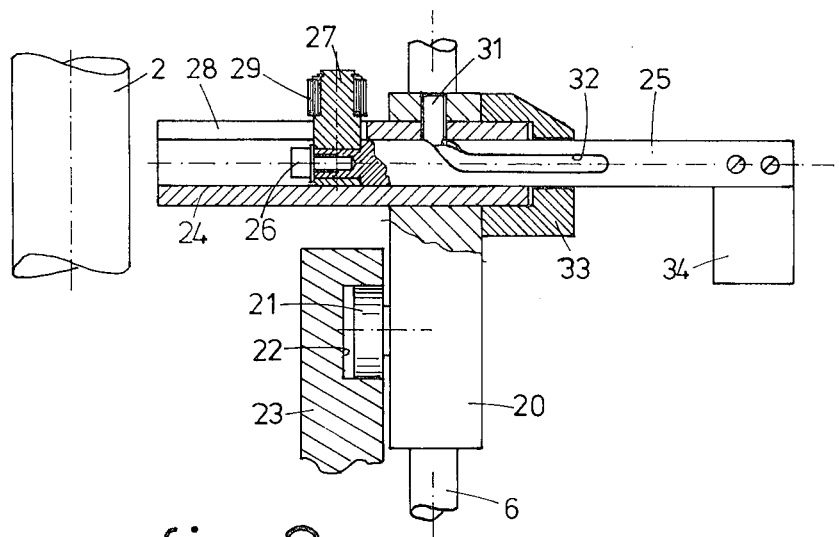
FIG. 3 is a side view of the unit shown in FIG. 2, partially in cross section.

The apparatus for breaking the neck of fowl shown in the drawings, has a frame 1 in which a vertical non rotating central shaft 2 is axially slidable by means of a crank drive 3. Two horizontal circular supports 4 and 5 are rotatably mounted on the central shaft 2, at a distance over each other. The supports 4 and 5 are interconnected by means of a plurality of pairs of vertical guide bars 6, the ends of which are attached to the supports 4 and 5 by means of mounting blocks 7 and 8, which are evenly spaced around the circumference of the supports 4 and 5.

The upper support 4 is attached to a sleeve 9, which is rotatably mounted on the central shaft 2. The upper end of the sleeve 9 is provided with a flange 10 with two upwardly extending pins 11, which are slidably received in coresponding openings in a horizontal driving wheel 12, which is rotatably mounted on the central shaft 2 and is supported by the frame 1.

The circumferential edge of the driving wheel 12 is provided with a plurality of recesses 13, adapted to receive the trolleys 14 of a conveyor, which are movable along a rail 16 attached to the frame 1, by means of rollers 15. The trolleys 14 are attached to a pulling cable 17 or chain at regular intervals and each carry a shackle 18, which is attached to its trolley by means of a drop rod 19.

On each pair of guide bars 6 a slide block 20 is slidably mounted, which at its back surface is provided with a follower 21 cooperating with a fixed curve track 22 in a curve body 23 attached to the shaft 2.

Each slide block 20 is provided with a horizontal bore in which a sleeve 24 is fitted, which extends radially towards the central shaft 2. In the sleeve 24 a bar 25 is rotatably and slidably mounted. On the end of the sliding bar 25 facing the central shaft 2 a roller support 27 is rotatably attached to the sliding bar by means of a screw 26. The upper end of the roller support 27 protrudes upwardly through a slot 28 in the sleeve 24. A follower roller 29 is rotatably mounted on the protruding end of the support 27 and cooperates with a stationary curve track 30, which is attached to the central shaft 2. A bore is provided in the upper surface of the slide block 20 between the guide bars 6, and a pin 31 is fixed in this bore. The pin 31 is received in a groove 32 provided in the sliding bar 25.

On the front surface of the slide block 20 a clamping block 33 is mounted, which has a bore in which the end of the sleeve 24 is fixed and through which the sliding bar 25 protrudes outside of the slide block 20. A laterally extending pressure blade 34 is mounted in the outer end of the sliding bar 25. The groove 32 is so shaped that when the sliding bar 25 is drawn back towards the central shaft 2, the sliding bar 25 is rotated by the pin 31 in the groove 32 in such manner, that the blade 34 is brought into a horizontal position, whereas the blade 34 is turned downwards when the sliding bar 25 is extended.

The apparatus hereinabove described operates as follows:

As a bird hanging by the legs from a shackle 18 of a continuously moving overhead conveyor reaches the apparatus, the coresponding trolley 14, which is pulled along the rail 16 by the cable 17, is received in one of the recesses 13 of the driving wheel 12, and a loop shaped radially extending center bar 36, which is attached to the upper support 4, is received between the legs of the bird 35.

Because of the movement of the conveyor the driving wheel 12 is rotated about the central shaft 2 of the apparatus by the trolley 14 in the recess 13 of the driving wheel, so that the sleeve 9, the supports 4 and 5 and the slide blocks 20 on the guide bars 6 are taken along by the pins 11 in the holes of the driving wheel. In this matter the apparatus is driven by the overhead conveyor and automatically synchronised therewith.

As the center bar 36 is received between the legs of the bird 35 the neck of that bird is received between the fully extended sliding bar 25 and a guide 37 attached to the coresponding clamping block 33, while the sliding block 20 is in its lowermost position on the guide bars 6. Then the slide block 20 is moved upwards on the guide bars 6 by the follower 21 in the curve track 22, so that the shoulders of the bird 35 come to rest on the sliding bar 25 and the guide 37 and the bird is slightly lifted up.

At the same time the sliding bar 25 is pulled back towards the central shaft 2 by the follower 29 in the curve track 30, so that the blade 34 is turned up. When the slide block 20 has reached its uppermost position, the sliding bar 25 is pulled back so far that the neck is squeezed off against the clamping block 33 by the blade 34. Then the broken neck is pushed partially out of the skin as the slide block 20 moves down again, and finally the neck is released by extending the sliding bar 25 again.

Since the bird 35 is lifted up by the sliding bar 25 and the guide 37 until the slide block reaches its upper position, the neck will always be broken directly underneath the shoulders, regardless of the size of the bird. In this manner the apparatus is automatically adapted to the size of the bird. A rough adjustment to the average size of a flock of birds is made possible by the crank drive 3, which can move the cental shaft 2 and all parts attached thereto up and down relative to the frame 1, the driving wheel 12 and the rail 16, to which end the pins 11 are slidable within the holes of the driving wheel 12.

If it is desired to make a transverse incision in the skin of the neck of the bird, as is required in some countries, the relatively dull blade 34 can be given a sharp cutting edge. In that case the neck itself serves as a counter pressure surface when the incision is made, whereas the remaining part of the neck skin as well as the gullet and the windpipe which should not be damaged when the incision is made, are received in a groove 38 (FIG. 1) in the clamping block 33, so that they cannot be reached by the cutting edge.

I claim:

1. Apparatus for breaking the neck of a defeathered headless bird, which hangs by the legs from a shackle of an overhead conveyor, comprising:

a frame;

a support movably supported by said frame;

first moving means for moving said support along in synchronisation with said overhead conveyor during part of the path thereof;

second moving means for additionally moving said support up and down relative to said conveyor;

a forked clamping member carried by said support and adapted to receive the neck of said bird, one of the fork legs of said clamping member being axially slidable relative to said support;

a pressure bar attached to the outer end of said slidable leg and laterally extending towards the other leg of said clamping member; and means for controlling the movements of said support and said slidable leg in such manner that the neck of said bird is received in said forked clamping member when said support is in its lowermost position relative to said overhead conveyor and said slidable leg is fully extended relative to said support, after which said support is moved to its uppermost position and said slidable leg is pulled back towards said support, so that the neck is pressed into said clamping member by said pressure bar and broken thereby, then said support is moved down again, so that said broken neck is at least partially stripped out of the skin and finally said slidable leg is extended again.

2. Apparatus according to claim 1, in which said slidable leg of said clamping member is rotatable mounted in said support and means are provided for controlling the rotation of said leg in such manner that said pressure bar is turned upwards into the horizontal position as said leg is pulld back towards said support and said pressure bar is turned down into the vertical position as said leg is extended.

3. Apparatus for breaking the neck of a defeathered headless bird, which hangs by the legs from a shackle of an overhead conveyor, comprising:

a frame with a vertical central shaft;

a rail attached to said frame for guiding said overhead conveyor through a 180° bend along a circular path concentric with said shaft;

a horizontal wheel rotatably mounted on said shaft and driven by said overhead conveyor;

a plurality of pairs of vertical slide bars connected with said wheel and mounted for rotation about said shaft;

a slide block slidably mounted on each of said pairs of slide bars;

a forked clamping member extending radially outwards from each of said slide blocks and adapted to receive the neck of a bird, one of the fork legs of said clamping member being slidably and rotatably mounted in said slide block;

a pressure bar laterally extending from the outer end of said leg of said clamping member; and means for controlling the movements of said slide block and said leg in such manner that the neck of the bird is received in said clamping member when said slide block is in the lowermost position on said slide bars, said leg is pushed out all the way from said slide block and said pressure bar is turned down in the vertical position, after which said slide block is moved upwards to its uppermost position, said pressure bar is turned upwards to the horizontal position, and said leg is pulled back towards said slide block, so that said neck is pressed into said forked clamping member by said pressure member and broken thereby, then said slide block is moved down again, so that the broken neck is at least partially stripped out of the skin, and finally said leg is pushed outwards again and said pressure bar is turned down again into its vertical position.

4. Apparatus according to claim 1, wherein said pressure bar is provided with a sharp cutting edge for making a limited transverse incision in the skin of the neck of the bird as the said neck is broken.

5. Apparatus according to claim 2, wherein said pressure bar is provided with a sharp cutting edge for making a limited transverse incision in the skin of the neck of the bird as said neck is broken.

6. Apparatus according to claim 3, wherein said pressure bar is provided with a sharp cutting edge for making a limited transverse incision in the skin of the neck of the bird as said neck is broken.

* * * * *